United States Patent Office 3,366,676
Patented Jan. 30, 1968

3,366,676
USE OF AMINE SOLVENTS IN THE PREPARATION OF ETHANE-1-HYDROXY-1,1-DIPHOSPHONIC ACID
Jimmie K. Dyer, Cincinnati, Ohio, assignor to The Procter & Gamble Company, Cincinnati, Ohio, a corporation of Ohio
No Drawing. Filed Mar. 30, 1965, Ser. No. 444,046
5 Claims. (Cl. 260—502.4)

This invention relates to the preparation of organophosphorus compounds, and more particularly to the preparation of ethane-1-hydroxy-1,1-diphosphonic acid and salts thereof.

Ethane-1-hydroxy-1,1-diphosphonic acid is a known compound, a method for its preparation having been published as long ago as 1897 by Hans von Baeyer and K. A. Hofmann (Berichte 30, 1973–1978). The method described therein is essentially a reaction between glacial acetic acid and phosphorus trichloride. The reaction between these two reactants proceeds through the formation of acetyl chloride and phosphorous acid as intermediates.

Baeyer and Hofmann's work was preceded in this area by N. Menschutkin, who in 1865 reported a reaction between one equivalent of acetyl chloride and 1 equivalent of phosphorous acid. He reported his reaction product as being acetyl pyrophosphorous acid, $P_2(C_2H_3)H_3O_5 \cdot 2H_2O$. His procedure and analytical investigations are reported in Annalen d. Chemi, vol. 133, p. 317 (1865).

A similar reaction system is described in an article authored by Benjamine T. Brooks, entitled "The Action of Phosphorus Trichloride on Organic Acids; Monoacetyl Phosphorous Acid" and published in the Journal of the American Chemical Society, vol. 34, 492–499 (1912).

Reactions of the foregoing types are also described in German Patents 1,010,965 dated May 8, 1956; 1,082,235 dated May 25, 1960; 1,072,346 dated Dec. 31, 1959; and 1,107,204 dated May 25, 1961. These patents mention in discussing the foregoing reaction the possibility of employing acetic anhydride in place of acetyl chloride or in admixture with acetyl chloride as a reactant with phosphorous acid.

British Patent 940,138 published Oct. 23, 1963, also pertains to a process for the preparation of phosphonic acids containing at least two phosphorus atoms in the molecule. The reaction in this British patent is between phosphorous acid and acylating agents such as halides or anhydrides of (a) polycarboxylic acids, (b) unsaturated carboxylic acids or (c) monocarboxylic acids containing at least 7 carbon atoms.

Although the reaction of phosphorus trichloride with acetic acid has been known for some time, the discussion in the above references points out that the reaction system is a highly complex one and generally very little is really understood about it. In addition to not being well understood by workers in the past, the reaction system is complicated by the following additional factors. The reaction should be carried out in special corrosion-resistant equipment due to the presence of hydrogen chloride gas as a by-product of the reaction. Also, when the reaction is carried out at atmospheric pressure, large amounts of acetyl chloride are formed as reaction intermediates and this necessitates low reaction temperatures in order to minimize loss of this valuable intermediate reactant in the hydrochloride gas stream. The low reaction temperature results in a low reaction rate and unduly long reaction times. Only by the use of costly corrosion-resistant pressure equipment have these problems been overcome by prior art methods. A further problem of the reaction is that the final, and sometimes the intermediate, reaction products often precipitate in a semisolid heterogeneous mass which cannot be easily handled in conventional processing equipment.

It is an object of the present invention to provide an improved process for preparing ethane-1-hydroxy-1,1-diphosphonic acid which is free of the foregoing disadvantages. It is another object to provide a process for preparing ethane-1-hydroxy-1,1-diphosphonic acid which has as its advantages a reduced corrosion problem, reduced pressure requirements, increased reaction rate and the maintaining of a single phase reaction system. These and other objects will become apparent from a careful reading of the following description and examples of the present invention.

According to the present invention, the essential reactants, the phosphorus trichloride and the acetic acid are made to react in the presence of a lower aliphatic tertiary amine compound. Suitable tertiary amines are those having a formula $R_3N$ wherein R represents a lower alkyl radical containing from 1 to about 6 carbon atoms. Specific examples include trimethyl amine, triethyl amine, tributyl amine, tripentylamine, trihexylamine and tricyclohexylamine. The preferred amines are those containing from 2 to 4 carbon atoms, and especially tributylamine.

The normal stoichiometric ratio of the phosphorus trichloride and the acetic acid is 2:6. Ordinarily, this is not a critical proportion however, for the reaction will proceed, although with all of the foregoing disadvantages, even with greater than or less than stoichiometric quantities of the reactants. This degree of flexibility does not, however, apply to the present invention, for the employment of the tertiary amine introduces a critical factor into the reaction system. Thus, the molar ratio of phosphorus trichloride:acetic acid: tertiary amine must be in the range of from about 2:6:0.5 to 2:6:4, respectively and, preferably in a range of 2:6:1 to 2:6:3.5. The foregoing are molar ratios. If less than the lower limit of the tertiary amine solvent is employed, i.e., 0.5 mole, the reaction system will have in it a deleterious amount of free hydrogen chloride gas that will interfere with the smooth operation of the reaction. The use of too much amine solvent, i.e., in excess of 4 moles inhibits rather than promotes the reaction as respects speed of reaction and ease of operation.

In practicing the present process, the tertiary amine can be mixed initially either with the desired quantity of acetic acid or the phosphorus trichloride, and the thus formed mixture can then be brought into contact with the remaining ingredient. Alternatively, the acetic acid and the phosphorus trichloride can first be mixed together and then the tertiary amine solvent added. However, it is a preferred embodiment of the present invention to mix the tertiary amine such as tributylamine with the acetic acid, and to this mixture, with good stirring, add the phosphorus trichloride. There are slight discoloration problems that occur with the other two mixing sequences that are avoided by the procedure of the preferred embodiment.

The resulting solution which contains the three starting materials is then introduced into stirred pressure reactor and heated to a temperature in the range of from about 200° F. to 300° F. and preferably between 200° F. and 280° F. Reaction times on the order of from about 4 minutes to about 80 minutes can be used with a narrower preferred range being from 8 minutes to 30 minutes.

The improved process requires that the reaction be run under pressure. Broadly, the pressures can be within the range of from about 40 p.s.i.g. to about 400 p.s.i.g. Preferably, the pressure should be in the range of from 75 p.s.i.g. to 350 p.s.i.g.

The present invention is illustrated by the following examples. They are not in any way intended to limit or delineate the broadest scope of the invention as described herein and claimed in the appended claims.

All parts are by weight unless otherwise specified in the examples.

EXAMPLE I 1080 parts of acetic acid were added, with stirring, to 1948 parts of tributylamine. The resulting mixture was charged to a stirred, glass-lined, pressure reactor and 825 parts of $PCl_3$ were added with stirring. The molar ratio of phosphorus trichloride to acetic acid to tributylamine was, respectively, 2:6:3.5. The closed reactor was heated to 280° F. and the reaction carried out at that temperature for 23 minutes. The pressure during the reaction rose to 50 pounds per square inch gauge. The reaction product was dissolved in water and neutralized with ammonium hydroxide to a pH 9. The tributylamine separated as an insoluble phase and formed a layer at the top of the solution. This layer was removed by using a separatory funnel. The aqueous solution was then heated and blown with air to drive off the ammonia. The procedure was stopped when a pH of 5 was reached. The reaction product was then stripped by applying heat and drawing a vacuum of 20 millimeters.

The reaction product was then neutralized to a pH of 10 with sodium hydroxide, and then dried in a vacuum oven. The product was then analyzed for the presence of any unreacted phosphite ion, $HPO_3^{-2}$ by conducting a standardized iodine titration test. This test revealed that there was no remaining unreacted $HPO_3^{-2}$ ion, indicating that all of the phosphorus starting material had been converted to organo phosphorus reaction products. Further analysis revealed that the reaction product contained 32% ethane-1-hydroxy-1,1-diphosphonate, calculated as the trisodium salt.

A portion of the reaction product was also analyzed by means of phosphorus nuclear magnetic resonance technique and the spectrum analysis was as follows:

| Peak | Chemical Shift,[1] p.p.m. | Mole Percent Phosphorus |
|---|---|---|
| 1 | −9.7 | 13 |
| 2 | −13.2 | 18 |
| 3 | −17.3 | 69 |

[1] Relative to 85% $H_3PO_4$.

Peak 3 is the desired ethane-1-hydroxy-1,1-diphosphonate component. Peaks 1 and 2 are other organophosphorus products.

A sample of the reaction product was tested for its ability to sequester calcium ions. The test employed was a slightly modified version of the so-called "oxalate test" as described, for instance, by R. R. Irani and C. F. Callis in an article entitled "Metal Complexing by Phosphorus Compounds. I. The Dynamics of Association of Linear Polyphosphates in Calcium," appearing in The Journal of Physical Chemistry, vol. 64, 1398 (1960). By using this widely-used test, it was determined that 100 parts of the trisodium ethane-1-hydroxy-1,1-diphosphonate complexed 15.4 grams of calcium. Sodium tripolyphosphate, another known complexing compound, by this same test complexes from about 7 to about 8 grams of calcium per 100 grams of sodium tripolyphosphate.

In the preceding example, the tributylamine can be replaced with equimolar amounts of tripropylamine, tripentylamine, triethylamine, and equally good results are obtained.

EXAMPLE II

The general procedure described in Example I was repeated with 1080 parts of acetic acid being added to 555 parts of tributylamine with stirring. The mixture was charged to a stirred, glass-lined, pressure reactor and 825 parts of phosphorus trichloride were added. These amounts of phosphorus trichloride, acetic acid and tributylamine corresponded to molar proportions respectively of 2:6:1.

The reaction mixture was heated to 280° F. and held there for 22 minutes. The maximum pressure was 240 pounds per square inch gauge.

The reaction product was processed according to the exact procedure described in Example I.

Analysis of the reaction product revealed that it contained 50% trisodium ethane-1-hydroxy-1,1-diphosphonate. It contained no unreacted phosphite ion $HPO_3^{-2}$ as measured by iodine titration. By the modified oxalate test referred to in Example I, the sequestering ability of the reaction product was measured as 15.6 grams of calcium per 100 grams of trisodium ethane-1-hydroxy-1,1-diphosphonate.

NMR spectrum was found to be:

| Peak | Chemical Shift, p.p.m. | Mole Percent Phosphorus |
|---|---|---|
| 1 | −9.8 | 18 |
| 2 | −13.4 | 16 |
| 3 | −18.5 | 66 |

Peak 3 is the desired ethane-1-hydroxy-1,1-diphosphonate.

In this example, the tributylamine solvent can be replaced satisfactorily by triethylamine to provide the molar proportion of phosphorus trichloride:acetic acid:triethylamine present respectively of 2:6:3.5, and the reaction will be rapid and efficient.

EXAMPLE III

To 1080 parts of acetic acid were added 1110 parts of tributylamine and the mixture was stirred. It was then charged into a glass-lined pressure reactor, after which 825 parts of phosphorus trichloride were added with stirring. The respective molar proportions of phosphorus trichloride:acetic acid:tributylamine were 2:6:2. The closed reactor was then heated for 9 minutes, at which point the temperature had reached 280° F. An aliquot sample was promptly drawn from the reactor and into a crushed ice bath in order to quench the reaction. When this sample was examined by means of phosphorus nuclear magnetic resonance, it was found to contain only a trace of unreacted phosphite ion, $HPO_3^{-2}$. This was totally unexpected in view of the short time of the reaction at the point when the sample was drawn.

The temperature of the reaction mixture was maintained at 280° F. for 44 more minutes after the first sample was drawn, making a total reaction time of 53 minutes. The maximum pressure was observed to be 115 pounds per square inch. Again the reaction procedure was worked up according to Example I with the following results. The reaction product contained not even a trace of unreacted phosphite ion, $HPO_3^{-2}$, and analyzed out to 37% trisodium ethane-1-hydroxy-1,1-diphosphonate. The reaction product complexed 16.4 grams of calcium per 100 grams of trisodium ethane-1-hydroxy-1,1-diphosphonate. NMR data for the final reaction product was as follows:

| Peak | Chemical Shift, p.p.m. | Mole Percent Phosphorus |
|---|---|---|
| 1 | −11.2 | 12 |
| 2 | −14.4 | 11 |
| 3 | −17.6 | 5 |
| 4 | −20.4 | 72 |

Peak 4 is the desired ethane-1-hydroxy-1,1-diphosphonate product and peaks 1–3 are organophosphorus by-products.

In accordance with the present invention, tripropylamine can be substituted for the tributylamine of this example, temperature raised to 300° F. the pressure held to a maximum of 100 pounds per square inch, and the reactor run for only 5 minutes, and equally excellent results can be obtained.

EXAMPLE IV

To 1080 parts of acetic acid was added, with stirring 1110 parts of tributylamine; the mixture as in the preceding examples was added to a stirred, glass-lined, pressure reactor to which 825 parts of phosphorus trichloride were added. The molar proportions of phosphorus trichloride:acetic acid:tributylamine were 2:6:2 respectively. The closed reactor vessel was then heated to 250° F. over a span of only 14 minutes, and a sample of the reaction mixture was drawn into a crushed ice bath in order to immediately stop the reaction. This procedure corresponded to that of Example III, and again it was surprisingly found in the NMR analysis that the reaction had gone to completion as respects conversion of the starting phosphorus raw material. No trace of an intermediate phosphite ion $HPO_3^{-2}$ was found. There was no basis on which such a rapid reaction rate could have been predicted or expected based on the rate data obtained in the absence of a solvent.

The major mixture was continuously heated at 250° F. for a total of 77 minutes. Prior to the removal of the first sample at 14 minutes, the maximum pressure was 75 pounds per square inch. During the balance of the reaction, the pressure rose to 90 pounds per square inch.

Work up of the reaction product according to the procedure in Example I resulted in a reaction product containing no trace of unconverted phosphite ion $HPO_3^{-2}$ and 30% trisodium ethane-1-hydroxy-1,1-diphosphonate. On NMR analysis, the following data was obtained:

| Peak: | Chemical shift, p.p.m. |
|---|---|
| 1 | −4.6 |
| 2 | −10.3 |
| 3 | −13.4 |
| 4 | −15.8 |
| 5 | −18.5 |

Peak 5 is the desired ethane-1-hydroxy-1,1-diphosphonate product.

The modified oxalate test to determine sequestering capacity of the desired reaction product gave a value of 20.4 grams of calcium per 100 grams of trisodium ethane-1-hydroxy-1,1-diphosphonate.

Additional laboratory runs were carried out in order to provide comparisons between the preceding examples run according to the present invention in which a lower aliphatic tertiary amine solvent was employed and previously known reactions, omitting a solvent or replacing the lower aliphatic tertiary amine with another solvent such as pyridine. The results obtained from reactions in which no lower aliphatic tertiary amine solvent such as tributylamine, tripropylamine or tripentylamine was used were markedly inferior than the preceding examples.

For instance, according to one process in which stoichiometric amounts of acetic acid and phosphorus trichloride were reacted in the presence of pyridine at atmospheric pressure and 158° F. for 70 minutes, analysis shows that there was still present in the reaction solution about 12% of the initial phosphorus in the form of $HPO_3^{-2}$ ion. The indication was that under these conditions the reaction was relatively slow in the direction of preparing the desired reaction product.

According to another run in which no solvent was used but in which acetic acid and phosphorus trichloride were mixed in the usual stoichiometric amounts, heated to 290° F. for 20 minutes and the pressure allowed to reach 280 pounds per square inch, analysis showed that the reaction product contained 16% of the intermediate $HPO_3^{-2}$ ion. During the heat-up and reaction periods of this particular run, the by-product hydrochloride gas was vented from the reactor through a cooled pressure condenser.

Yet another illustration of the relatively poorer results obtained when one operates outside the scope of the present invention is described below.

A glass-lined pressure reactor was charged with 1080 parts of acetic acid and 825 parts of phosphorus trichloride with stirring. These amounts correspond to stoichiometric quantities. No solvent was used. The reactor was sealed and heated to 276° F. The pressure rose to a value of 460 pounds per square inch. After 35 minutes, the reactor was cooled by passing cold water through the jacket. During the cooling period the reaction mixture increased in viscosity to the point where the stirrer was under such stress that mixing had to be stopped for fear of damaging the equipment. Once the reactor was cooled to 200° F., a quantity of water was forced in to dissolve the gummy reaction mass. The hydrogen chloride gas was allowed to escape through a vent valve. At the end of this operation, 3048 grams of a somewhat viscous but aqueous solution was drained from the reactor. This solution still contained the crude reaction products as well as substantial portions of acetic acid and hydrogen chloride. A 400 gram portion of the aqueous viscous solution was evacuated to 20 mm. mercury and heated to drive off the acetic acid and hydrogen chloride. After this stripping operation 85.6 grams of a gummy solid remained out of the 400 grams initially taken. This gummy product was neutraized to a pH of 9 with potassium hydroxide, and the resulting salt solution was dried in a vacuum oven. The weight of dry salt obtained was 137.2 grams. The dry salt was tested by an iodine titration; and after all of the extra special precautions required by the reaction, it was discovered that almost 5% of the phosphorus initially charged to the reactor was still unconverted to the desired ethane-1-hydroxy-1,1-diphosphonate containing reaction product.

The foregoing Examples of the present invention, along with the illustrations of prior art processes, point out the unexpected improvements of the present invention. When the teachings of the present invention are followed, the reaction is rapid and conversion of the phosphorus charged to the reactor proceeds efficiently and completely. In the four examples above, it was seen that after reaction times of only 23, 22, 9 and 14 minutes respectively, there remained in the reaction product at the very most only a trace of unconverted $HPO_3^{-2}$ ion. In contrast, the other reactions discussed after the Examples above showed that after reactions of 70, 20, and 35 minutes, phosphorus was present in the reaction mixture in the relatively large amounts of 12%, 16% and 5%. Moreover, whereas the three latter runs were seriously hampered by problems such as the formation of viscous, gummy reaction products that made a continuous process almost impossible, the reaction according to the present invention provides for a markedly increased reaction rate and a single phase, easily managed reaction system.

The invention has been described in its preferred embodiments by which lower alkyl tertiary amine solvents can be employed. In addition, however, it should also be noted that some other amine reaction systems can also be used advantageously, but they require substantial modifications in the reaction conditions. For these and other reasons, such compounds as pyridine, dimethyl dodecyl amine, and quinoline, while they can be used, are less preferred.

Moreover, while preferred molar proportions of the essential ingredients have been described above, it can be noted also that the present reaction proceeds outside of these proportions, although with such attendant disadvantages as to make the process impracticable. In addition, variations in the temperatures, reaction times, and pressures can be made in the reaction described herein; but it will be found that such factors as rate of reaction, conversion of the reactants charged to the reactor, the unmanageable phases in the reaction mixture, as well as yields of the desired ethane-1-hydroxy-1,1-diphosphonate containing reaction product, make it necessary to practice the present invention within the ranges, proportions and conditions described above.

Examples of other solvent compounds which cannot, for one reason or other, be used in the present process are primary and secondary amines including monobutylamine, dibutylamine, monopropylamine, dipropylamine, mono- and diethylamine, methylbutylamine and phenolamine.

As has been described above in connection with the examples, the reaction products prepared by the improved process can be used generally as sequestering and complexing materials in many areas of application. Several uses are described in the German patents mentioned above including, for example, as additives in textile dye baths, as material to decrease ash concentration in fabrics which have been treated with soaps or polyphosphate-containing detergents. The reaction products of the present invention can also be used in such general applications of sequestering agents as scale prevention, cleaning metal surfaces such as boilers and reaction vessels, aluminum etching, in paints, rubber, plastics, for their ability to sequester metals and alkaline salts including zinc, iron, magnesium, calcium and the like.

What I claim is:

1. A process for the preparation of ethane-1-hydroxy-1,1-diphosphonic acid which consists essentially of mixing phosphorus trichloride with acetic acid in the presence of a lower aliphatic tertiary amine solvent having a formula $R_3N$ wherein R is a lower alkyl radical having from 1 to about 6 carbon atoms, the molar ratio of phosphorus trichloride, acetic acid and tertiary amine being in the range from about 2:6:0.5 to about 2:6:4, respectively, and heating said mixture to a temperature of from about 200° F. to about 300° F. at a pressure of from about 40 to about 400 pounds per square inch for a period of from about 4 to about 80 minutes.

2. A process according to claim 1 wherein said lower aliphatic tertiary amine solvent is selected from the group consisting of trimethylamine, triethylamine, tripropylamine, tributylamine, tripentylamine, trihexylamine, and tricyclohexylamine.

3. A process according to claim 1 wherein said lower aliphatic tertiary amine solvent is tributylamine.

4. A process according to claim 3 wherein the molar ratio of the phosphorus trichloride, acetic acid and tertiary amine solvent is in a range of from 2:6:1 to 2:6:3.5.

5. A process according to claim 3 wherein the temperature is in a range of from 220° F. to 280° F. and the pressure within a range of from 75 to 350 pounds per square inch gauge.

References Cited

FOREIGN PATENTS 1,148,551  5/1963  Germany.

OTHER REFERENCES

Brooks: "J. Am. Chem. Soc.," vol. 34 (1932), pp 492 to 449.

LEON ZITVER, *Primary Examiner.*

J. E. EVANS, *Assistant Examiner.*